United States Patent
Huang et al.

(10) Patent No.: US 10,503,898 B2
(45) Date of Patent: Dec. 10, 2019

(54) METHOD FOR DEFENDING AGAINST MALWARE

(71) Applicant: GRAND MATE CO., LTD., Taichung (TW)

(72) Inventors: Chung-Chin Huang, Taichung (TW); Chin-Ying Huang, Taichung (TW); Hsin-Ming Huang, Taichung (TW); Hsing-Hsiung Huang, Taichung (TW); Yen-Jen Yeh, Taichung (TW); Yung-She Lin, Taichung (TW)

(73) Assignee: GRAND MATE CO., LTD., Taichung (TW)

( * ) Notice: Subject to any disclaimer, the term of this patent is extended or adjusted under 35 U.S.C. 154(b) by 210 days.

(21) Appl. No.: 15/723,581

(22) Filed: Oct. 3, 2017

(65) Prior Publication Data
US 2019/0102544 A1 Apr. 4, 2019

(51) Int. Cl.
*G06F 21/55* (2013.01)
*G06F 21/53* (2013.01)
*G06F 21/56* (2013.01)
*G06F 21/57* (2013.01)

(52) U.S. Cl.
CPC ............ *G06F 21/554* (2013.01); *G06F 21/53* (2013.01); *G06F 21/562* (2013.01); *G06F 21/568* (2013.01); *G06F 21/57* (2013.01)

(58) Field of Classification Search
CPC ...... G06F 21/554; G06F 21/53; G06F 21/562; G06F 21/568; G06F 21/57
USPC .......................................................... 726/22
See application file for complete search history.

(56) References Cited

U.S. PATENT DOCUMENTS

| | | | |
|---|---|---|---|
| 2004/0003273 A1* | 1/2004 | Grawrock | G06F 21/57 713/193 |
| 2015/0074810 A1 | 3/2015 | Saher et al. | |
| 2018/0018458 A1* | 1/2018 | Schmugar | G06F 21/566 |
| 2018/0146009 A1* | 5/2018 | Primm | H04L 63/1491 |
| 2019/0109870 A1* | 4/2019 | Bedhapudi | H04L 63/1425 |

FOREIGN PATENT DOCUMENTS

| | | |
|---|---|---|
| CN | 100374972 C | 3/2008 |
| CN | 102867146 A | 1/2013 |
| TW | 201543257 A | 11/2015 |

OTHER PUBLICATIONS

English Abstract for China patent document 100374972, publication date Mar. 12, 2008, total of 1 page.
English Abstract for Taiwan patent document 201543257, publication date Nov. 16, 2015, total of 1 page.
(Continued)

*Primary Examiner* — Michael S McNally
(74) *Attorney, Agent, or Firm* — R. Lynette Wylie; Tracy M. Heims; Apex Juris, pllc

(57) ABSTRACT

A malware for defending against a malware includes the following steps: create a bait file in a storage media of an electric appliance; check whether the bait file is changed; when the bait file is changed, shut down the electric appliance. Thus, when the bait file is changed, it is determined that the malware has begun to execute, and the electric appliance is shut down immediately, so as to avoid the other files in the storage medium from continuously being changed by the malware, facilitating the follow-up information rescue.

17 Claims, 4 Drawing Sheets

(56) References Cited

OTHER PUBLICATIONS

English Abstract for China patent document 102867146, publication date Jan. 9, 2013, total of 1 page.
Taiwan Examination Report for 106121434 dated Jul. 10, 2018, total of 5 pages.
Taiwan Search Report for 106121434 dated Jul. 10, 2018, total of 1 page.

* cited by examiner

METHOD FOR DEFENDING AGAINST MALWARE

BACKGROUND OF THE INVENTION

1. Technical Field

The present invention relates to a computer virus protection, and more particularly to a method for defending against a malware.

2. Description of Related Art

Malware in an electric appliance can be divided into destructive viruses and malicious viruses, wherein the destructive viruses usually disrupt the operation of the electric appliance. The malicious viruses usually encrypt specific files (such as document files, image files, video files, etc.) in the storage media without disrupting the system files of the operating system. As a result, it is usually too late when users find that the files are encrypted.

Typically, an electric appliance would be infected by the malware by downloading an attachment in e-mails or web pages. Most of the malicious virus system uses 2048 bits RSA algorithm to encrypt files, so that the encrypted file could not be decrypted without a decryption key.

However, in the early advent of malicious viruses, antivirus programs cannot find the malicious viruses out. As a result, it is hard to prevent the electric appliance from the malicious viruses. If an electric appliance is infected, the user can only demand payment to reverse the damage, or abandon the encrypted files.

BRIEF SUMMARY OF THE INVENTION

In view of the above, the primary objective of the present invention is to provide a method for defending against a malware, which could prevent the files from being changed continuously by the malware.

To achieve the objective of the present invention, the present invention provides a method for defending against a malware, including A. create at least one bait file in a storage media of an electric appliance; B. check whether the at least one bait file is changed; when the at least one bait file is changed, shut down the electric appliance.

With the aforementioned design, when the bait file is changed, it is determined that the malware has begun to execute, and the electric appliance 10 is shut down immediately, whereby to avoid the expansion of the disaster, facilitating the follow-up information rescue.

BRIEF DESCRIPTION OF THE SEVERAL VIEWS OF THE DRAWINGS

The present invention will be best understood by referring to the following detailed description of some illustrative embodiments in conjunction with the accompanying drawings, in which

FIG. 2 is a schematic diagram, showing the electric appliance that the method of the first embodiment is applied to;

FIG. 3 is a schematic diagram, showing the system that the method of a second embodiment is applied to; and FIG. 4 is a schematic diagram, showing the system that the method of a third embodiment is applied to.

DETAILED DESCRIPTION OF THE INVENTION

Figure 1:
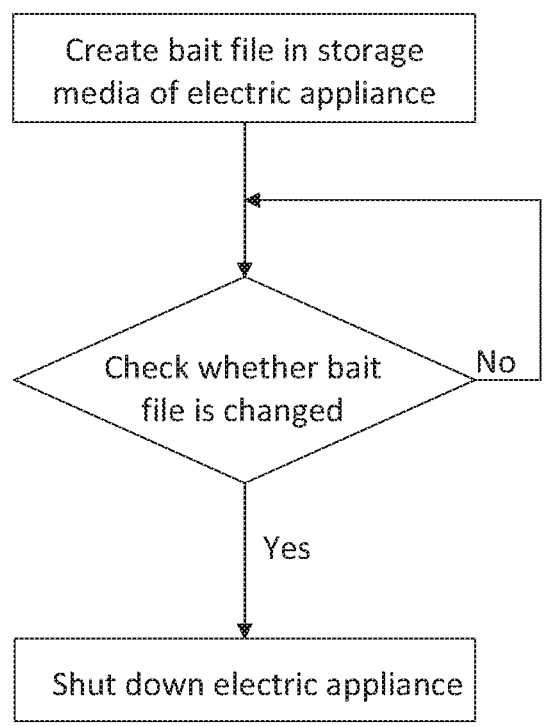
FIG. 1 is a flowchart of method for defending against the malware of a first embodiment of the present invention.
Figure 2:
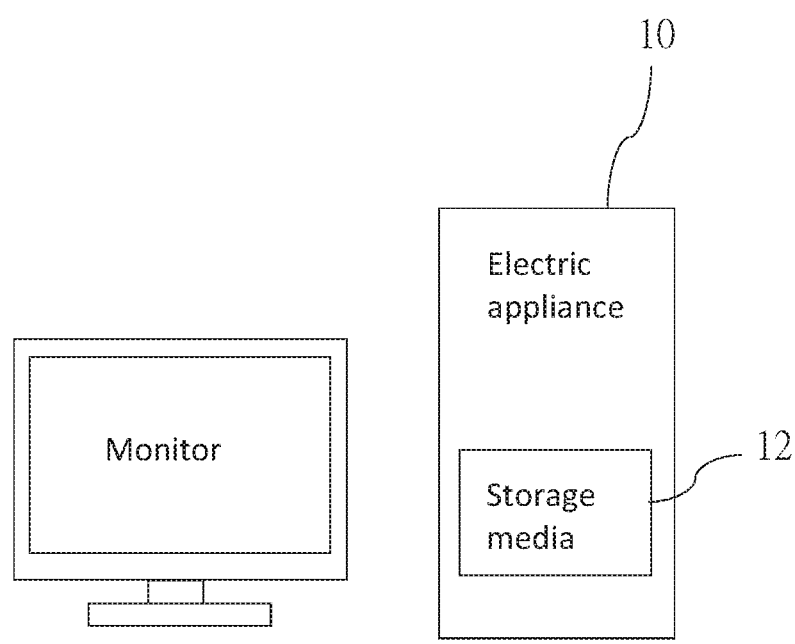

A flowchart of a method for defending against malware of a first embodiment of the present invention is illustrated in FIG. 1, wherein the method is adapted for application to an electric appliance 10 shown in FIG. 2. The electric appliance 10 has a storage media 12, wherein the electric appliance 10 is a computer as an example. In other embodiments, the electric appliance 10 could be a smartphone or any device having the storage media 12. Said storage medium 12 could include a fixed storage medium or a removable storage medium, wherein the fixed storage medium includes at least one hard disk drive or at least one solid state disk, and the removable storage media includes at least one USB flash drive or at least one memory card. The method includes the following steps.

At least one bait file is created in a predetermined data path of the storage media 12 of the electric appliance 10, wherein the bait file has a file name. The file name includes a base name and a filename extension. A predetermined content is created in the bait file. In the current embodiment, the bait file is a text file with "txt" filename extension. However, the file format of the bait file is not a limitation of the present invention. In other embodiments, the bait file could be a document file, an image file, a video file, a voice file, a compressed file, etc. The bait file is created in the predetermined data path of the storage medium 12 in which the electric appliance 10 stores the operating system. Take the computer as an example, the malware usually encrypts files in accordance with the code and the file name of the drive, and therefore, the predetermined data path is preferably "C: \" or "D: \", and the base name of the bait file is preferably set as a number, such as "0".

In practice, it could check the number of the files of each of the data paths in the storage medium 12 first, in order to create the bait file in one of the data paths with the largest number of files. Alternatively, the user could specify the data path of the bait file.

The bait file is checked by a guard program, and when the bait file is changed, the electric appliance 10 is shut down by the guard program. In the current embodiment, the guard program is executed after the electric appliance 10 is turned on, and the bait file is checked every predetermined time (e.g., 1 minute). If the bait file is not changed, the bait file is checked again after the predetermined time. If it is checked that the file name of the bait file does not exist in the predetermined data path, or the bait file exists but the bait file does not contain the predetermined content, it is determined that the bait file is changed.

In practice, it could create a plurality of bait files in a plurality of data paths in the storage medium 12, respectively, and to check whether the bait files in the data paths are changed every predetermined time. When any of the bait files is changed, the electric appliance 10 is shut down by the guard program.

In this way, when the electric appliance 10 is infected by the malware, the electric appliance 10 can be turned off by the method of the present embodiment, whereby to prevent other files in the storage medium 12 from continuously being changed by the malware after the bait file is encrypted by the malware. After that, the storage medium 12 could be detached from the electric appliance 10, and be connected to another electric appliance so as to copy or move the unmodified file in the storage medium 12 to another storage medium.

The method further includes that when the electric appliance 10 is turned on again, the guard program checks whether a removable storage medium (not shown), which is connected to the electric appliance 10, has a malware removal program having a predetermined file name.

If the removable storage medium has the malware removal program, the malware removal program is executed to remove the malware and to recover files that have been changed.

If the removable storage medium does not have the malware removal program, the electric appliance 10 is shut down by the guard program.

In this way, when a user gets the malware removal program, the malware removal program could be stored in the removable storage medium (such as USB flash drive), and the malware removal program is renamed as the predetermined file name. Then, the removable storage medium is connected to the electric appliance 10, and the electric appliance 10 restarts. Thus, the method of the present embodiment could execute the malware removal program, and the electric appliance 10 is restored to an available state.

Figure 3:
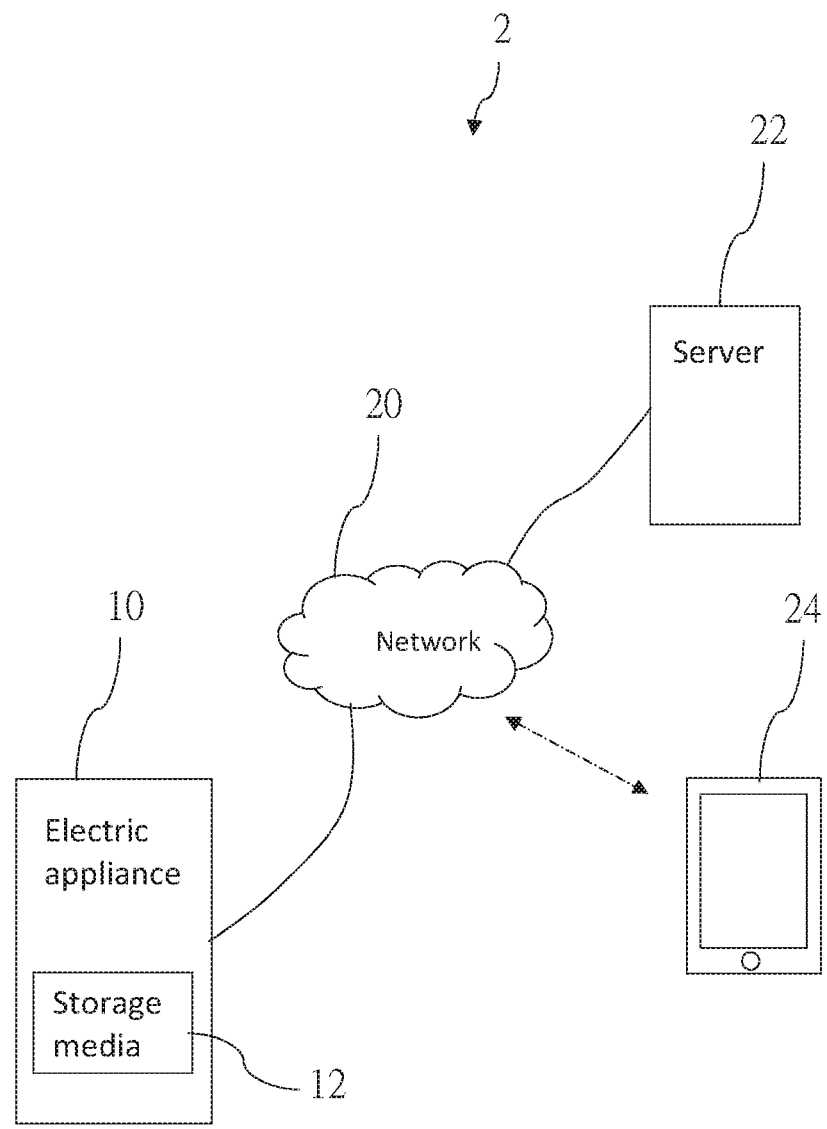

A method for defending against malware of a second embodiment of the present invention is adapted to be applied to a system 2 illustrated in FIG. 3, wherein the system 2 includes at least one electric appliance 10 shown in FIG. 2. The electric appliance 10 is connected to a server 22 via a network 20, wherein the network 20 could be an internet or a local area network.

The method of the second embodiment has almost the same steps as said method of the first embodiment, except that the method of the second embodiment further includes the following steps before the guard program checks whether the bait files are changed.

A portable device 24 is connected to the server 22 via the internet, and a corresponding relation between the electric appliance 10 and the portable device 24 is established in the server 22.

When it is detected that the bait file is changed, the electric appliance 10 sends a first message to the server 22 first, and then the electric appliance 10 is shut down by the guard program.

Thereafter, the server 22 sends a second message to the portable device 24 in accordance with the first message and the corresponding relation. Thus, when the user notices that the portable device 24 receives the second message, the user is notified that the electric appliance 10 is infected by the malware and can take appropriate measures accordingly.

Figure 4:
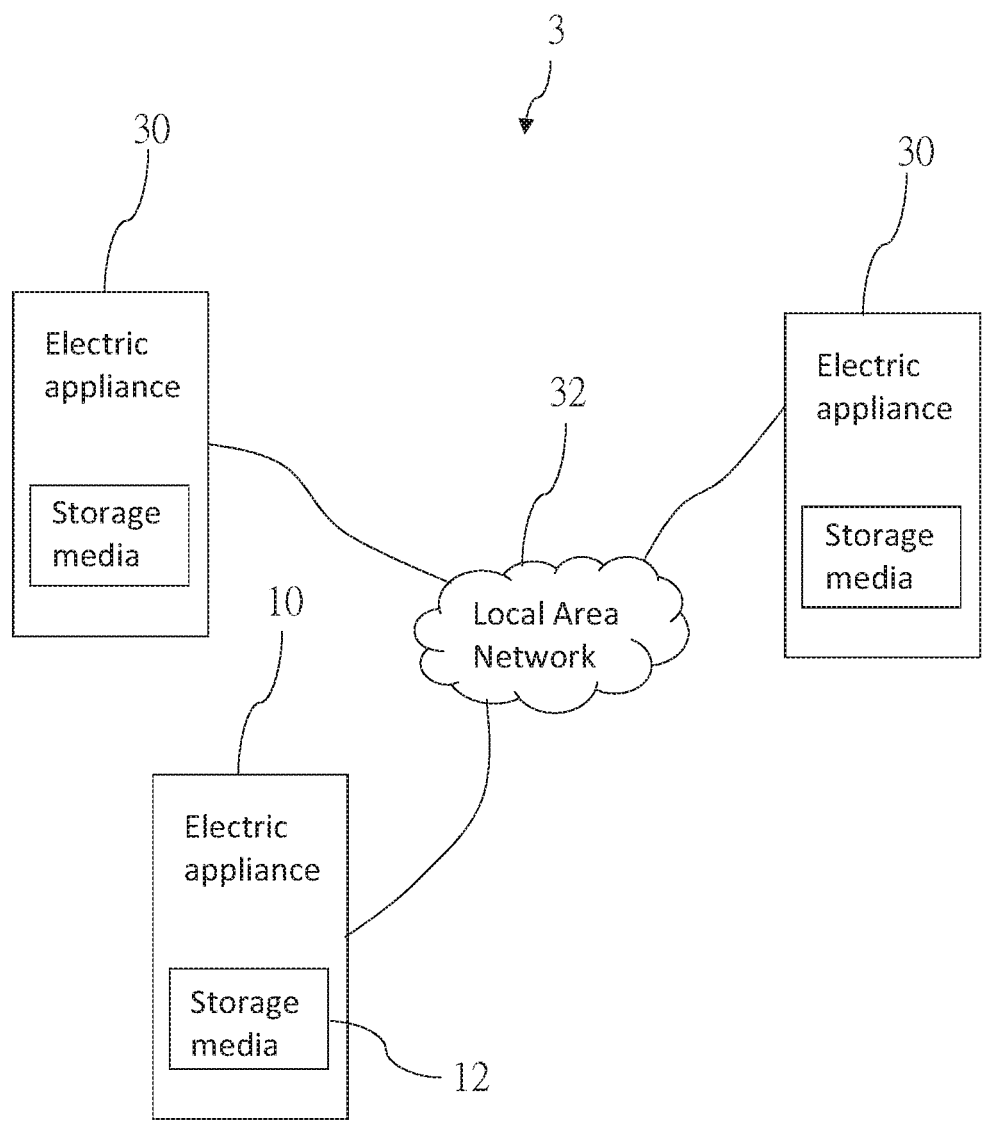

A method for defending against malware of a third embodiment of the present invention is adapted for application to a system 3 illustrated in FIG. 4, wherein the system 3 includes at least one electric appliance 10 of the second embodiment and at least one another electric appliance 30, and the electric appliances 10, 30 are connected to a local area network 32. In the current embodiment, the another electric appliance 30 includes a plurality of electric appliances 30, wherein the electric appliances also have the storage media, the guard program, and the bait file, just like the electric appliance 10.

The method of the third embodiment has almost the same steps as said method of the first embodiment, except that when it is detected that any of the electric appliances 10, 30 (take the electric appliance 10 as an example) is changed, the electric appliance 10 sends a message to the other two electric appliances 30. When the two electric appliances 30 receive the message, the connection between each of the two electric appliances 30 and the local area network 32 is terminated, respectively. In this way, the files of the other two electric appliances 30 could be prevented from being changed by the malware. In addition, the local area network 32 could be connected to the server 22 of the second embodiment. In such a case, one of the electric appliances with the revised bait file sends the message to the server 22, and the server 22 sends the message to the other electric appliances, so that the connection between each of the two electric appliances and the local area network 32 is terminated, respectively.

Also, the system 3 of the third embodiment could be used in conjunction with the system 2 of the second embodiment, so as to be connected to the server 22 and the portable device 24. Thus, when it is checked that the bait file is changed, the electric appliance 10 sends the first message to the server 22 first, and the electric appliance 10 is shut down then.

In conclusion, by creating the bait file in the storage medium 12 of the electric appliance 10, when the bait file is changed, it is determined that the malware has begun to execute. At this time, the electric appliance 10 is shut down immediately to thereby avoid the expansion of the disaster, facilitating the follow-up information rescue.

It must be pointed out that the embodiments described above are only some preferred embodiments of the present invention. All equivalent methods which employ the concepts disclosed in this specification and the appended claims are contemplated to fall within the scope of the present invention.

What is claimed is:

1. A method for defending against a malware, comprising:
   A. creating at least one bait file in a storage media of an electric appliance; and
   B. checking whether the at least one bait file is changed; when the at least one bait file is changed, shutting down the electric appliance;
   wherein the electric appliance is connected to a server; the method further comprises that connecting a portable device to the server and establishing a corresponding relation between the electric appliance and the portable device before step B; step B further comprises that sending a first message to the server, and the server sends a second message to the portable device in accordance with the first message and the corresponding relation before shutting down the electric appliance.

2. The method of claim 1, wherein step A further comprises creating a predetermined content in the at least one bait file; checking the at least one bait file in step B, when the at least one bait file does not comprise the predetermined content, the at least one bait file is determined being changed.

3. The method of claim 1, wherein, in step B, when the at least one bait file is checked that a file name of the at least one bait file does not exist in the storage media, the at least one bait file is determined being changed.

4. The method of claim 1, wherein the electric appliance and at least one another electric appliance are connected to a local area network; before shutting down the electric appliance, step B further comprises that sending a message to the at least one another electric appliance, when the at least one another electric appliance receives the message, the connection between the at least one another electric appliance and the local area network is terminated.

5. The method of claim 1, wherein, step A further comprises that creating a plurality of bait files in a plurality of data paths in the storage medium, respectively; checking whether the bait files in the data paths are changed in step B; when any of the bait files is changed, shutting down the electric appliance.

6. The method of claim 1, wherein step A further comprises that checking the number of files of each of the data paths in the storage medium and creating the bait file in one of the data paths with the largest number of files.

7. The method of claim 1, after step B, the method further comprises that restarting the electric appliance after shutting down the electric appliance, and checking whether a removable storage medium has a malware removal program having a predetermined file name:
  if the removable storage medium has the malware removal program, executing the malware removal program;
  if the removable storage medium does not have the malware removal program, shutting down the electric appliance.

8. A method for defending against a malware, comprising:
  A. creating at least one bait file in a storage media of an electric appliance; and
  B. checking whether the at least one bait file is changed; when the at least one bait file is changed, shutting down the electric appliance;
  wherein the electric appliance and at least one another electric appliance are connected to a local area network; before shutting down the electric appliance, step B further comprises that sending a message to the at least one another electric appliance, when the at least one another electric appliance receives the message, the connection between the at least one another electric appliance and the local area network is terminated.

9. The method of claim 8, wherein step A further comprises creating a predetermined content in the at least one bait file; checking the at least one bait file in step B, when the at least one bait file does not comprise the predetermined content, the at least one bait file is determined being changed.

10. The method of claim 8, wherein, in step B, when the at least one bait file is checked that a file name of the at least one bait file does not exist in the storage media, the at least one bait file is determined being changed.

11. The method of claim 8, wherein, step A further comprises that creating a plurality of bait files in a plurality of data paths in the storage medium, respectively; checking whether the bait files in the data paths are changed in step B; when any of the bait files is changed, shutting down the electric appliance.

12. The method of claim 8, wherein, step A further comprises that checking the number of files of each of the data paths in the storage medium and creating the bait file in one of the data paths with the largest number of files.

13. A method for defending against a malware, comprising:
  A. creating at least one bait file in a storage media of an electric appliance; and
  B. checking whether the at least one bait file is changed; when the at least one bait file is changed, shutting down the electric appliance;
  wherein after step B, the method further comprises that restarting the electric appliance after shutting down the electric appliance, and checking whether a removable storage medium has a malware removal program having a predetermined file name:
  if the removable storage medium has the malware removal program, executing the malware removal program;
  if the removable storage medium does not have the malware removal program, shutting down the electric appliance.

14. The method of claim 13, wherein step A further comprises creating a predetermined content in the at least one bait file; checking the at least one bait file in step B, when the at least one bait file does not comprise the predetermined content, the at least one bait file is determined being changed.

15. The method of claim 13, wherein, in step B, when the at least one bait file is checked that a file name of the at least one bait file does not exist in the storage media, the at least one bait file is determined being changed.

16. The method of claim 13, wherein, step A further comprises that creating a plurality of bait files in a plurality of data paths in the storage medium, respectively; checking whether the bait files in the data paths are changed in step B; when any of the bait files is changed, shutting down the electric appliance.

17. The method of claim 13, wherein, step A further comprises that checking the number of files of each of the data paths in the storage medium and creating the bait file in one of the data paths with the largest number of files.

* * * * *